May 7, 1957     T. HINDMARCH     2,791,306
FRICTION CLUTCH
Filed Dec. 21, 1953
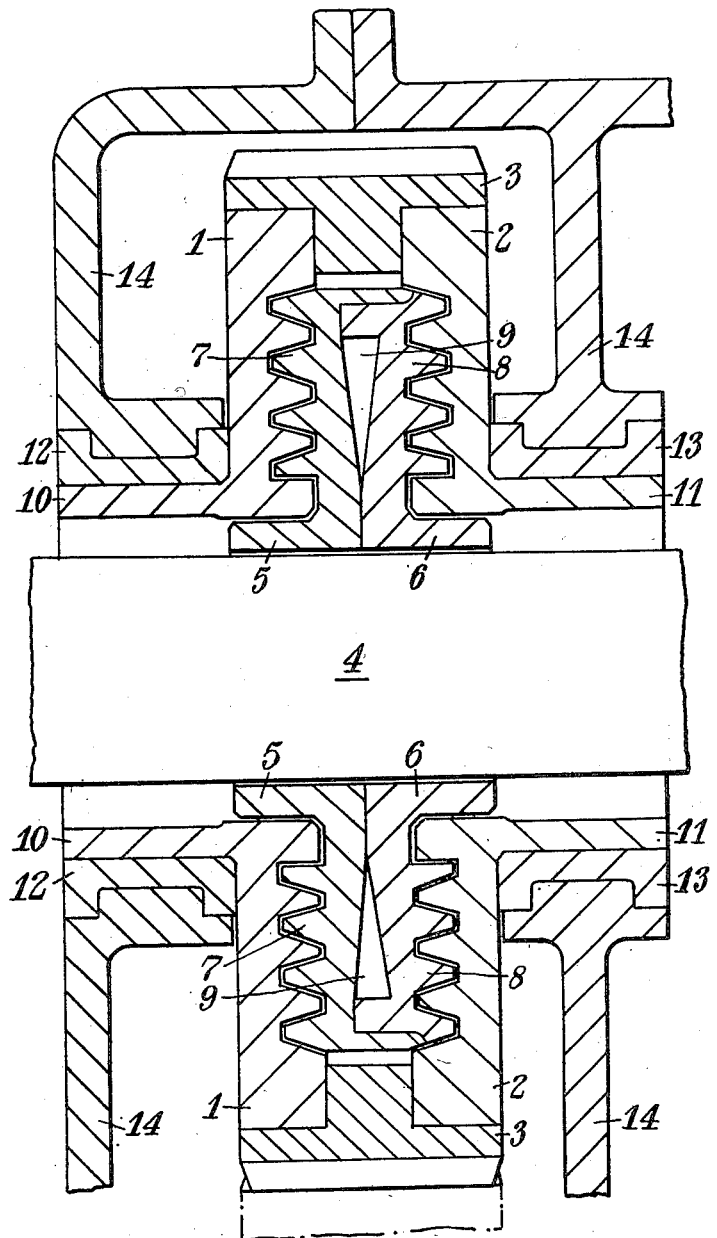
Inventor
T. Hindmarch

United States Patent Office 2,791,306
Patented May 7, 1957

2,791,306

FRICTION CLUTCH

Thomas Hindmarch, Chesham, England

Application December 21, 1953, Serial No. 399,370

Claims priority, application Great Britain March 25, 1953

2 Claims. (Cl. 192—85)

This invention relates to friction clutches.

In one form of known pinion which incorporates a clutch for drivingly connecting the pinion to a concentric shaft when required, the clutch, whether it be of the cone or grooved plate kind, has an engageable friction member or friction members fixed to or formed as part of the pinion and the co-operating friction member or friction members splined to the shaft so as to be capable of being moved axially in respect of the shaft to engage the other friction member or members to establish the drive between the shaft and pinion. The axially fixed member or members associated with the pinion take their bearing upon a cylindrical projection upon the axially movable member or members, and some radial clearance is essential here and around the splines and the shaft to allow of the said axial movement of the said movable member or members to engage and disengage the clutch. When the clutch is engaged, the first mentioned clearance has no effect as the co-operating friction members become located coaxially in relation to one another, but when the clutch is disengaged the pinion may become eccentric in relation to the shaft to an undesirable degree due to the clearances referred to. When such a clutched pinion is used in a constant mesh gear and acts as an idler the outer clutch member carrying the teeth is not held sufficiently concentric to permit accurate meshing of the gear teeth.

The object of the present invention is to provide a pinion having incorporated therewith a friction clutch in which adequate concentricity is maintained when the clutch is in the disengaged condition.

The invention consists in a fluid pressure operated clutched pinion comprising a casing for the pinion, a shaft, splines on said shaft, a pair of disc-like inner V-grooved clutch members mounted back to back co-axial of said shaft, an inner cylindrical spigot-like projection upon each inner clutch member upon the remote sides thereof and a sliding fit upon the shaft, splines upon the inner surfaces of the said inner spigots co-operating with the said splines upon the shaft to allow longitudinal movement of said inner clutch members away from and towards one another with rotational movement with said shaft, an outer cylindrical spigot-like projection upon the outer periphery of each inner clutch member upon the adjacent sides thereof providing a fluid tight sliding fit therebetween, a circumferential depression in the adjacent faces of the inner clutch members forming a pressure fluid chamber therebetween when the clutch members are in intimate contact, an annular cylindrical toothed ring co-axial of the shaft and having a centrally disposed radially inwardly extending ring-like web, the inner radius of which is greater than the outer radius of the inner clutch members, a pair of disc-like outer V-grooved clutch members one each side of the said web, within the said toothed ring and fastened thereto, the V-grooves on the outer clutch members being adapted to co-operate with the V-grooves on the inner clutch members, a co-axial cylindrical spigot-like projection on each outer clutch member upon the remote sides thereof clear of contact with the inner spigot-like projections upon the inner clutch members and the shaft, and bearings upon the casing co-axial of the shaft within which the spigot-like projections upon the outer clutch members rotate.

The accompanying drawing shows, by way of example only, a known form of clutch and a clutch constructed in accordance with the invention in which:

The figure is a longitudinal section of the clutch constructed in accordance with the present invention.

The two outer clutch members 1 and 2 are connected by a toothed gear ring 3 by means of which a drive to or from the shaft 4 may be transmitted when the clutch is engaged. These clutch members are mounted for free rotation upon the cylindrical spigot-like projections 10 and 11 upon the bearings 12 and 13 in the casing 14. The inner clutch members 7 and 8 are splined upon the shaft 4 by spigot-like projections 5 and 6 by means of which they can move longitudinally of the shaft away from one another to contact the outer members 1 and 2 to transmit the drive when pressure fluid is introduced into the pressure cavity 9.

The bearings of the outer members, which do not require to have axial movement, are independent of the inner movable clutch members or discs, by reason of being mounted on the casing independent of the shaft.

The running of the gear of the clutch constructed in accordance with the invention is completely independent of the clearances provided between the clutch members and around the splines, thus enabling these to be adjusted to suit other requirements. In cases where the shaft does not carry any radial load, no additional bearings for this shaft are required, but they must be fitted when, for instance, a pinion is driven by this shaft.

As the outer member or gear wheel does not rotate on the shaft, but rotates by means of its journals on bearings which are carried in stout bosses rigidly mounted in the body of the casing itself as shown, it does not matter what clearance may have to be given between the outer and inner member and between the inner member and the shaft, for no error can be transmitted to the point of engagement of the gear wheels.

The pinion constructed in accordance with the invention can be usefully employed in a constantly meshed form of change direction and/or change speed gear box particularly where the pinion transmits a drive between pinions on parallel shafts and acts as an idler when its clutch is disengaged. Under such a condition the pinion runs concentrically and its teeth are maintained at correct depth of engagement with other pinions.

The construction herein described in reference to the drawing is by way of example only and details for carrying the invention into effect may be varied without departing from the scope of the invention.

I claim:

1. A friction clutch comprising a casing, a shaft extending through the casing, a pair of inner disc-like clutch members mounted coaxial with the shaft and splined to the shaft for axial movement toward and away from each other, with the inner clutch members defining a pressure fluid chamber therebetween, a pair of outer disc-like clutch members co-operable with the inner clutch members, a bearing in each side of the casing through which the shaft projects free of engagement with the bearings, an annular extension on each of the outer clutch members disposed in each of the bearings thereby mounting the outer clutch members in the casing independently of the shaft, a ring gear carried by the periphery of the outer clutch members, and co-operable interengaging surfaces on adjacent faces of the inner and outer clutch members to impart a drive by way of the shaft and the ring gear when pressure fluid is introduced into the pressure fluid chamber.

2. A friction clutch as defined in claim 1 wherein said interengaging surfaces include co-operable annular V-shaped grooves on the outer faces of the inner clutch members and on the inner faces of the outer clutch members.

References Cited in the file of this patent

UNITED STATES PATENTS

| | | |
|---|---|---|
| 2,161,702 | Durig | June 6, 1939 |
| 2,333,682 | Schneider | Nov. 9, 1943 |
| 2,684,737 | Johansson | July 27, 1954 |